United States Patent
Horikawa et al.

(10) Patent No.: US 12,265,246 B2
(45) Date of Patent: Apr. 1, 2025

(54) PLANAR ILLUMINATION DEVICE

(71) Applicant: MINEBEA MITSUMI Inc., Nagano (JP)

(72) Inventors: Tomotaka Horikawa, Kitasaku-gun (JP); Kota Matsunaga, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/653,149

(22) Filed: May 2, 2024

(65) Prior Publication Data

US 2025/0004188 A1 Jan. 2, 2025

(30) Foreign Application Priority Data

Jun. 27, 2023 (JP) .................................. 2023-105184

(51) Int. Cl.
*F21V 8/00* (2006.01)
*G02F 1/13357* (2006.01)

(52) U.S. Cl.
CPC ......... *G02B 6/0016* (2013.01); *G02B 6/0068* (2013.01); *G02F 1/133615* (2013.01); *G02F 1/133609* (2013.01)

(58) Field of Classification Search
CPC .. G02B 6/0016; G02B 6/0068; G02B 6/0018; G02B 6/002; G02F 1/133615; G02F 1/133609
See application file for complete search history.

(56) References Cited

U.S. PATENT DOCUMENTS

| | | | |
|---|---|---|---|
| 9,885,913 | B2 | 2/2018 | Shiraishi et al. |
| 2008/0002429 | A1 | 1/2008 | Noba |
| 2016/0116667 | A1 | 4/2016 | Shiraishi et al. |
| 2018/0046028 | A1 * | 2/2018 | Chang .................... G02B 6/002 |

FOREIGN PATENT DOCUMENTS

| | | | | |
|---|---|---|---|---|
| CN | 104345377 A | * | 2/2015 | ........... G02B 6/0013 |
| CN | 105278028 A | * | 1/2016 | |
| CN | 111781670 A | * | 10/2020 | ................ F21S 2/00 |
| CN | 113514917 A | * | 10/2021 | |
| JP | 2008-010291 A | | 1/2008 | |
| JP | 2016-085329 A | | 5/2016 | |
| KR | 20080099039 A | * | 11/2018 | |
| WO | WO-2016002883 A1 | * | 1/2016 | ................ F21S 2/00 |

* cited by examiner

*Primary Examiner* — Erin Kryukova

(74) *Attorney, Agent, or Firm* — Chrisman Gallo Tochtrop LLC

(57) ABSTRACT

A planar illumination device of an embodiment includes a light guide plate for emitting light incident from a light incident side surface from one principal surface of two principal surfaces, and a plurality of light sources arranged in a longitudinal direction of the light incident side surface and emitting light incident on the light incident side surface. The light sources include a light emitting element for emitting first light and a wavelength conversion material for emitting second light having a wavelength longer than a wavelength of the first light by the light emitted by the light emitting element. The light incident side surface is formed with a plurality of rows of first irregularities extending in a width direction of the light guide plate and diffusing incident light in a thickness direction of the light guide plate in a partial range in the thickness direction of the light guide plate, the range opposing the light emitting element.

9 Claims, 16 Drawing Sheets

(1)

(2)

COLOR GRADIENT MITIGATION

PLANAR ILLUMINATION DEVICE

CROSS-REFERENCE TO RELATED APPLICATIONS

This application claims the benefit of priority to Japanese Patent Application Number 2023-105184 filed on Jun. 27, 2023. The entire contents of the above-identified application are hereby incorporated by reference.

TECHNICAL FIELD

The disclosure relates to a planar illumination device.

BACKGROUND

As a planar illumination device used as a backlight of a liquid crystal panel or the like, an edge light-type planar illumination device is known. In the edge light-type planar illumination device, a light source for emitting white light is disposed along a side surface (light incident side surface) of a light guide plate, and light incident on the light incident side surface is emitted from one principal surface (emission surface) of the light guide plate. For such a planar illumination device, a technique for suppressing color unevenness in the emission surface is known.

As the light source for emitting white light, a light emitting diode (LED) for emitting red light, an LED for emitting green light, and an LED for emitting blue light are simultaneously turned on to mix the red light, the green light, and the blue light and obtain white light in a known configuration. For example, Japanese Patent Application Publication No. 2008-10291 discloses a backlight formed with a first light dispersion unit and a second light dispersion unit having a semi-cylindrical shape extending respectively in a width direction and a thickness direction on an entire surface of a light incident side surface in order to suppress color unevenness caused by insufficient color mixing. In such a backlight, the red light, the green light, and the blue light incident from the light incident side surface are dispersed in a wide range in the thickness direction and the width direction and are mixed in the vicinity of the light incident side surface, so that uniform white light can be emitted in the emission surface.

As the light source for emitting white light, white light is obtained by disposing a yellow phosphor around a blue LED chip in a known configuration. In the light source having such a known configuration, the longer the distance for the blue light to pass through the phosphor, the more yellowish light is emitted, and thus the emitted light has a more yellow tint at the emission surface in the vicinity of the light incident side surface of the light guide plate. For example, Japanese Patent Application Publication No. 2016-85329 discloses a backlight formed with an incident surface protrusion extending in a thickness direction on a light incident side surface opposing a region having a large amount of blue spectrum of a light-emitting surface of a light source. In such a backlight, since more bluish light is dispersed in the width direction by the incident surface protrusion, it is possible to suppress the yellow tint on the emission surface in the vicinity of the light incident side surface.

SUMMARY

However, in Japanese Patent Application Publication No. 2016-85329 described above, it is necessary to precisely align a position of the blue LED chip in the light source with a position of the incident surface protrusion. In addition, in the light source with the phosphor around the blue LED chip, the chromaticity of light also changes in the thickness direction depending on the distance for blue light to pass through the phosphor. Even when the technique, disclosed in Japanese Patent Application Publication No. 2008-10291, for diffusing incident light uniformly in both the width direction and the thickness direction, is applied to a backlight using such a light source, it is difficult to control the chromaticity in the emission surface. As such, the above-described related art has room for further improvement in terms of suppressing color unevenness in the emission surface.

The disclosure has been made in view of the above, and an object of the disclosure is to provide a planar illumination device capable of suppressing color unevenness in an emission surface without requiring highly precise alignment of a light source and a light guide plate.

In order to achieve the above object, according to an aspect of the disclosure, there is provided a planar illumination device including: a light guide plate configured to emit light incident from a light incident side surface from one principal surface of two principal surfaces; and a plurality of light sources arranged in a longitudinal direction of the light incident side surface and configured to emit light incident on the light incident side surface. The light sources include a light emitting element configured to emit first light and a wavelength conversion material configured to emit second light having a wavelength longer than a wavelength of the first light by the light emitted by the light emitting element. The light incident side surface is formed with a plurality of rows of first irregularities extending in a width direction of the light guide plate and configured to diffuse incident light in a thickness direction of the light guide plate in a partial range in the thickness direction of the light guide plate, the range opposing the light emitting element.

The planar illumination device according to an aspect of the disclosure can suppress color unevenness in an emission surface.

DESCRIPTION OF EMBODIMENTS

Figure 1:
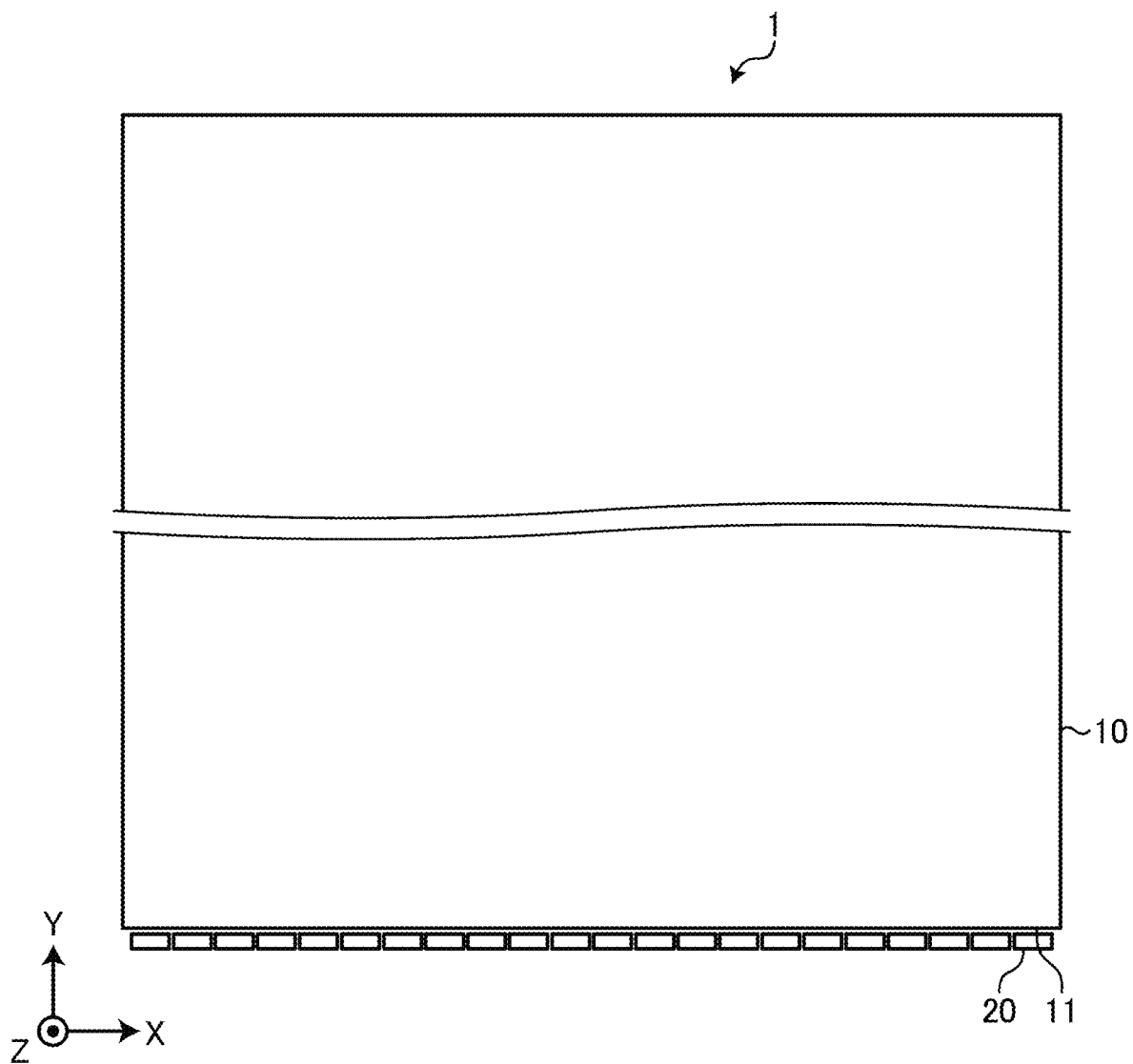
FIG. 1 is a top view schematically illustrating a configuration of a planar illumination device according to an embodiment.

A planar illumination device according to an embodiment is described below with reference to the drawings. Note that the disclosure is not limited to the embodiment. Furthermore, the dimensional relationships between elements, proportions of the elements, and the like in the drawings may differ from reality. The drawings may include parts having mutually different dimensional relationships and scales. Furthermore, the contents described in one embodiment or modification example are applied in principle to other embodiments or modification examples.

Embodiment

Figure 2:
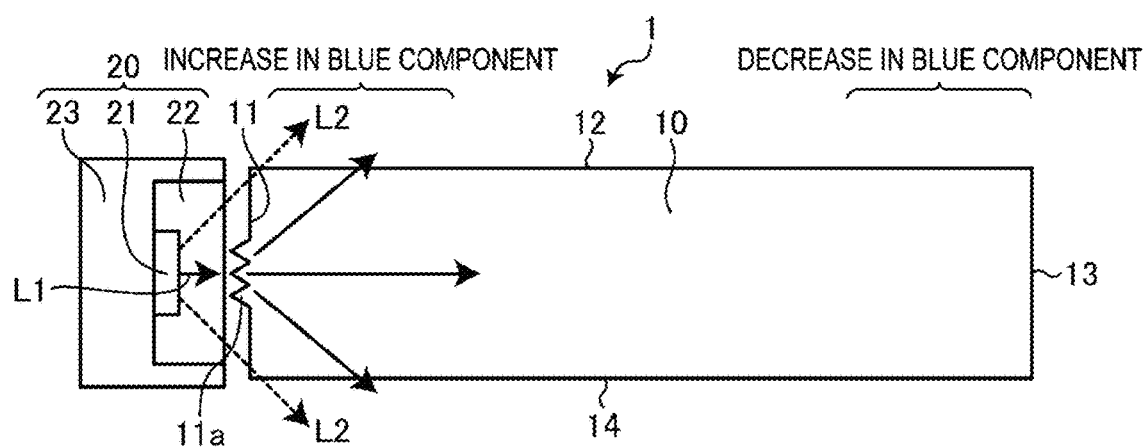
FIG. 2 is a side view schematically illustrating a configuration of a planar illumination device according to an embodiment.
Figure 2:
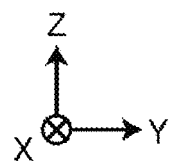

FIG. 1 is a top view schematically illustrating a configuration of a planar illumination device 1 according to an embodiment, and FIG. 2 is a side view schematically illustrating the configuration of the planar illumination device 1 according to the embodiment. As illustrated in FIGS. 1 and 2, the planar illumination device 1 includes a light guide plate 10 and a plurality of light sources 20.

The light guide plate 10 is a flat plate-like member formed in a rectangular shape in a top view, and is made of a transparent material such as polycarbonate resin. The light guide plate 10 has a light incident side surface 11, an emission surface 12, a terminal end surface 13, and an opposite surface 14.

The light incident side surface 11 is a side surface opposing a light-emitting surface of the light source 20, light from the light source 20 being incident on the light incident side surface. The terminal end surface 13 is a side surface opposite from the light incident side surface 11. The emission surface 12 is a principal surface of two principal surfaces of the light guide plate 10 at a Z-axis positive direction side being an emission direction of light. The opposite surface 14 is a principal surface of the two principal surfaces of the light guide plate 10 at a Z-axis negative direction side being the opposite side from the emission surface 12. The opposite surface 14 is formed with, for example, an optical path changing pattern composed of a plurality of dots.

Light incident from the light incident side surface 11 travels in a Y-axis positive direction being a light guiding direction, and is emitted from the emission surface 12 by the optical path changing pattern formed on the opposite surface 14. That is, the planar illumination device 1 according to the embodiment is an edge light-type illumination device. Note that the light incident side surface 11 of the light guide plate 10 is formed with first irregularities (first optical elements) 11a for diffusing incident light in a thickness direction of the light guide plate 10. The first irregularity 11a will be described below.

The plurality of light sources 20 are arranged in an X-axis direction and emit light incident on the light incident side surface 11. Here, the X-axis direction is a width direction of the light guide plate 10, and the Z-axis direction is a thickness direction of the light guide plate 10. The X-axis direction is also a longitudinal direction of the light incident side surface 11, and the Z-axis direction is also a short-length direction of the light incident side surface 11.

The light source 20 includes a light emitting element for emitting blue light (first light), and a phosphor (yellow phosphor) as a wavelength conversion material for emitting yellow light (second light having a wavelength longer than a wavelength of the first light) by the light emitted by the light emitting element. For example, as illustrated in FIG. 2, the light source 20 includes a blue Light Emitting Diode (LED) chip 21 (hereinafter, referred to as blue LED chip 21), a sealing body 22, and a package 23. The blue LED chip 21 is disposed at a substantially central part of a bottom of a rectangular parallelepiped recessed part provided at the package 23. The sealing body 22 is a resin for sealing the blue LED chip 21, is made of a resin with a yellow phosphor dispersed in the resin, and is filled in the recessed part of the package 23. The light source 20 emits pseudo white light by mixing the blue light emitted by the blue LED chip 21 and the yellow light emitted by the yellow phosphor having absorbed the blue light. Each of the plurality of light sources 20 is mounted on (electrically connected to) a Flexible Printed Circuit (FPC) (not illustrated) via an electrode (not illustrated) formed at an outer surface of the package 23. Note that, although not illustrated, the planar illumination device 1 includes various optical sheets stacked at the emission surface 12 side of the light guide plate 10, a reflection sheet disposed at the opposite surface 14 side of the light guide plate 10, a frame accommodating the light guide plate 10, the light source 20, and the like, in addition to the FPC. In addition, the phosphor as the wavelength conversion material is not limited to the yellow phosphor as a single substance, and may be, for example, a combination of a red phosphor and a green phosphor.

Figure 3:
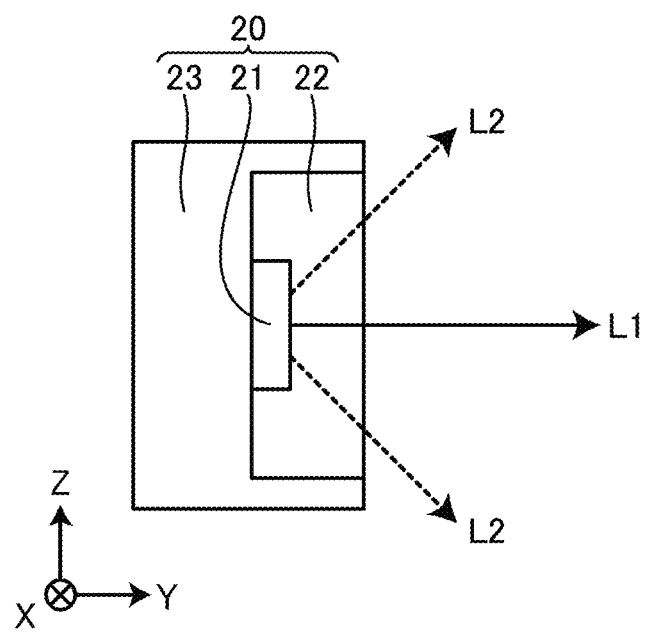
FIG. 3 is a view for illustrating emitted light from a light source illustrated in FIG. 2.

Here, an occurrence of color unevenness due to the configuration of the light source 20 will be described with reference to FIGS. 3 and 4. FIG. 3 is a view for illustrating emitted light from the light source 20 illustrated in FIG. 2, and FIG. 4 is a side view schematically illustrating a configuration of a planar illumination device l'in a different form from the embodiment.

Light L1 illustrated in FIG. 3 is light emitted in an optical axis direction (Y-axis direction) of the light source 20, and light L2 illustrated in FIG. 3 is light emitted in a direction with a large angle to the optical axis of the light source 20. Since the light L2 traveling obliquely from the blue LED chip 21 travels a longer distance to pass through the sealing body 22 than the light L1 traveling straight from the blue LED chip 21, the light L2 becomes more yellowish white light than the light L1. In other words, since the light L1 travels a shorter distance to pass through the sealing body 22 than the light L2, the light L1 becomes more bluish white light than the light L2.

Figure 4:
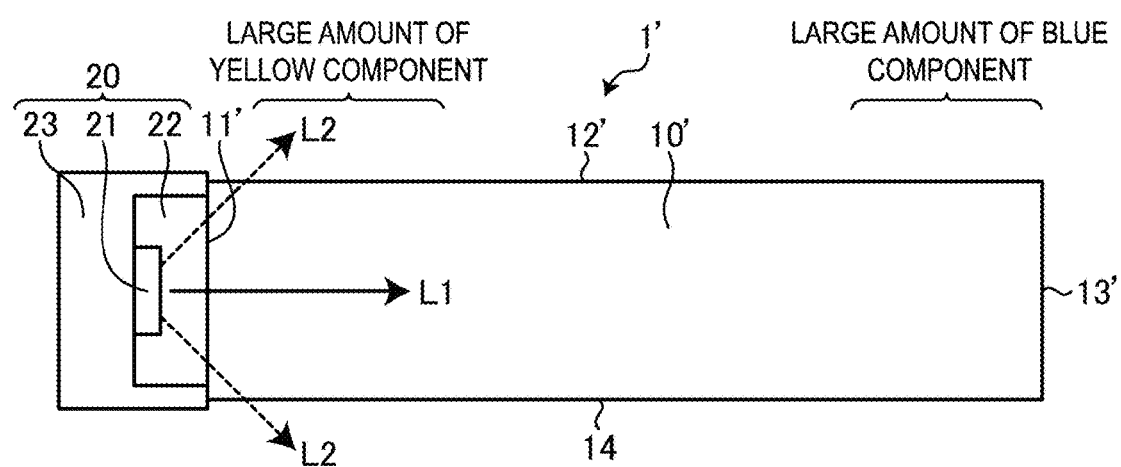
FIG. 4 is a side view schematically illustrating a configuration of a planar illumination device in a different form from an embodiment.
Figure 4:
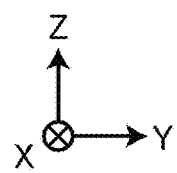

In a configuration of the planar illumination device l' illustrated in FIG. 4, the light guide plate 10 of the planar illumination device 1 illustrated in FIG. 3 is replaced with a light guide plate 10'. A light incident side surface 11' of the light guide plate 10' is not formed with first irregularities 11a described below. In such a planar illumination device l', the light L2traveling obliquely is emitted from an emission surface 12' in the vicinity of the light incident side surface 11', as illustrated in FIG. 4. For this reason, the emission surface 12' in the vicinity of the light incident side surface 11' has a yellow tint (a large amount of yellow component). On the other hand, as illustrated in FIG. 4, the light LI propagates through the light guide plate 10' and tends to be emitted from the emission surface 12' from a center to a terminal end surface 13' side. For this reason, a portion from the center of the emission surface 12' to the terminal end surface 13' side has a blue tint (a large amount of blue component). This results in a color gradient on the emission surface 12'.

On the other hand, as illustrated in FIG. 2, the light incident side surface 11 of the light guide plate 10 according to the embodiment is formed with a plurality of rows (three rows in FIG. 2) of first irregularities 11a for diffusing incident light in the thickness direction in a partial range in the thickness direction (Z-axis direction) of the light guide plate 10. The range in the thickness direction formed with the first irregularities 11a is a range opposing the blue LED chip 21. Note that, although not illustrated in FIG. 2, the first irregularities 11a are formed at the light incident side surface 11 from one end to the other end in the width direction.

A part of the light L1 being more bluish white light is diffused in the thickness direction by the first irregularities 11a and is emitted from the emission surface 12 in the vicinity of the light incident side surface 11, as illustrated in FIG. 2. As a result, the light incident side surface 11 side of the emission surface 12 has a blue tint (an increase in the blue component) as compared with FIG. 4. In addition, as illustrated in FIG. 2, the light propagating through the light guide plate 10 has a yellow tint as compared with FIG. 4 because the blue component decreases. As a result, the blue tint decreases (a decrease in the blue component) from the center of the emission surface 12 to the terminal end surface 13 side, compared with the case of Comparative Example. Thereby, the color of light emitted from the light guide plate is balanced, and the color gradient of the emission surface 12 is reduced. As such, by forming the first irregularities 11a at the light incident side surface 11, it is possible to suppress color unevenness in the emission surface 12.

Figure 5:
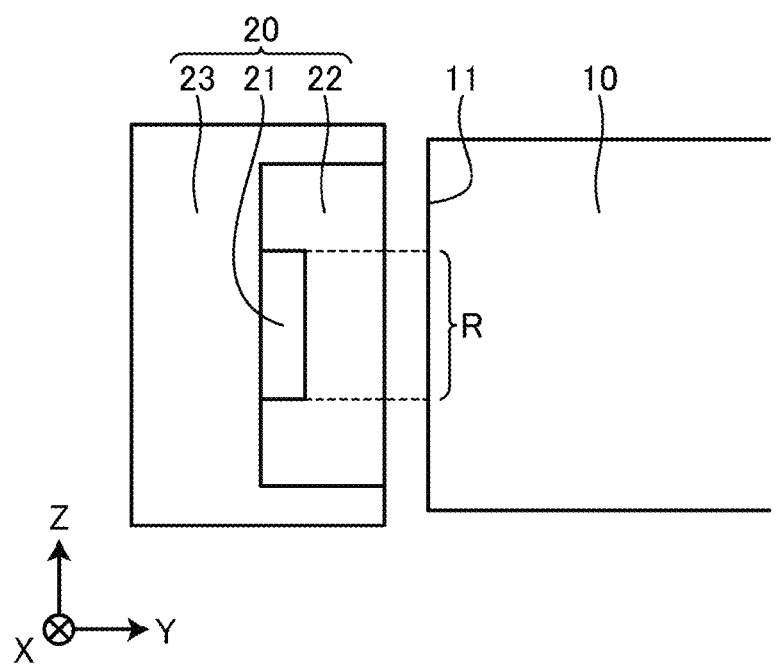
FIG. 5 is a view for illustrating a range formed with first irregularities.

FIG. 5 is a view for illustrating a range formed with the first irregularities 11a. The "range opposing the blue LED chip 21" being formed with the first irregularities 11a at the light incident side surface 11 is not limited to a range R obtained by parallel projection of the blue LED chip 21 in the Y-axis direction as illustrated in FIG. 5. For example, the range formed with the first irregularities 11a may be a range partially overlapping the range R or a range included in the range R and being narrower than the range R. In addition, the range formed with the first irregularities 11a may be a range including the range R and wider than the range R so as to be able to absorb a positional deviation in the thickness direction of the plurality of blue LED chips 21 disposed along the width direction. Alternatively, the range formed with the first irregularities 11a may be defined as, for example, a range of incident light having a blue tint and having a v' value of a predetermined value or less in the CIE chromaticity diagram. That is, the range formed with the first irregularities 11a may be a range with color unevenness in the emission surface 12 suppressed to the extent required by the design specifications.

Note that, since the plurality of light sources 20 are arranged at intervals in the planar illumination device 1, brightness and darkness may occur in the width direction of the emission surface 12. For this reason, in the embodiment, preferably the light emitted from the light source 20 is diffused in the width direction at the light incident side surface 11. The light incident side surface 11 of the light guide plate 10 according to the embodiment may also be formed with a plurality of rows of second irregularities (second optical elements) 11b (described below) extending in the thickness direction and diffusing the incident light in the width direction.

EXAMPLES

Hereinafter, the above-described embodiment will be described more specifically based on examples, but the embodiment is not limited to these examples.

Example 1

Figure 6:
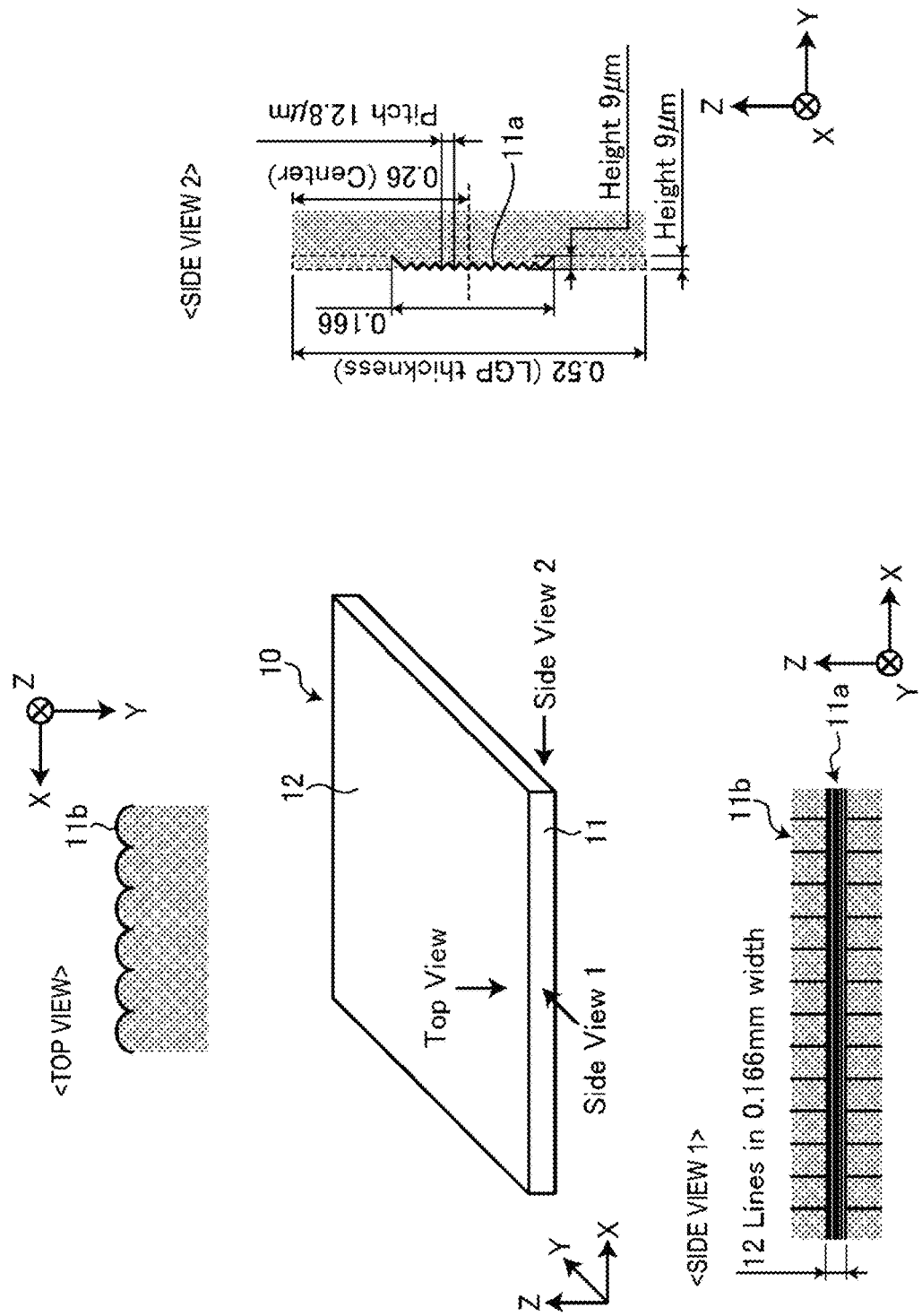
FIG. 6 is a view for illustrating Example 1.
Figure 7A:
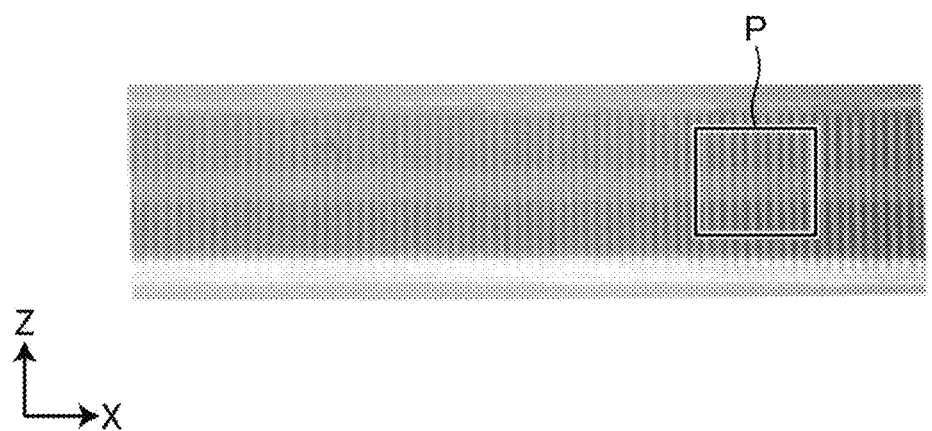
FIG. 7A is a view (1) for illustrating a light incident side surface of Example 1.
Figure 7B:
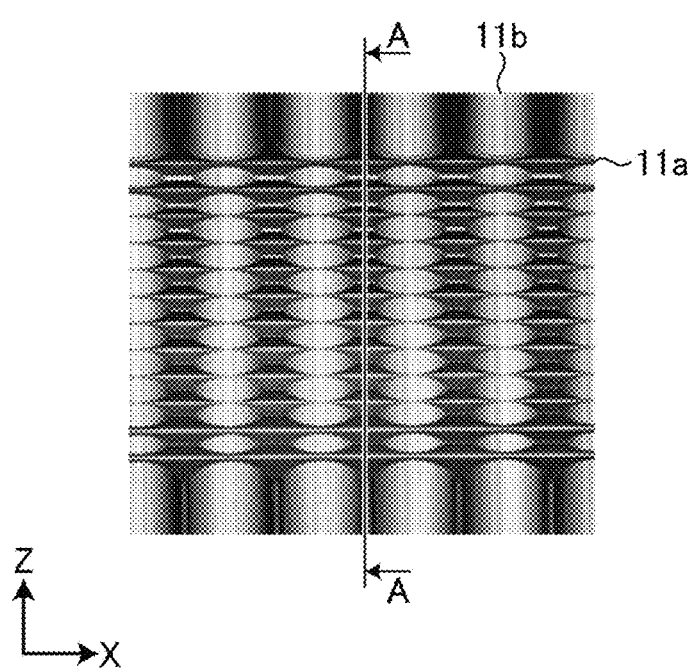
FIG. 7B is a view (2) for illustrating the light incident side surface of Example 1.
Figure 7C:
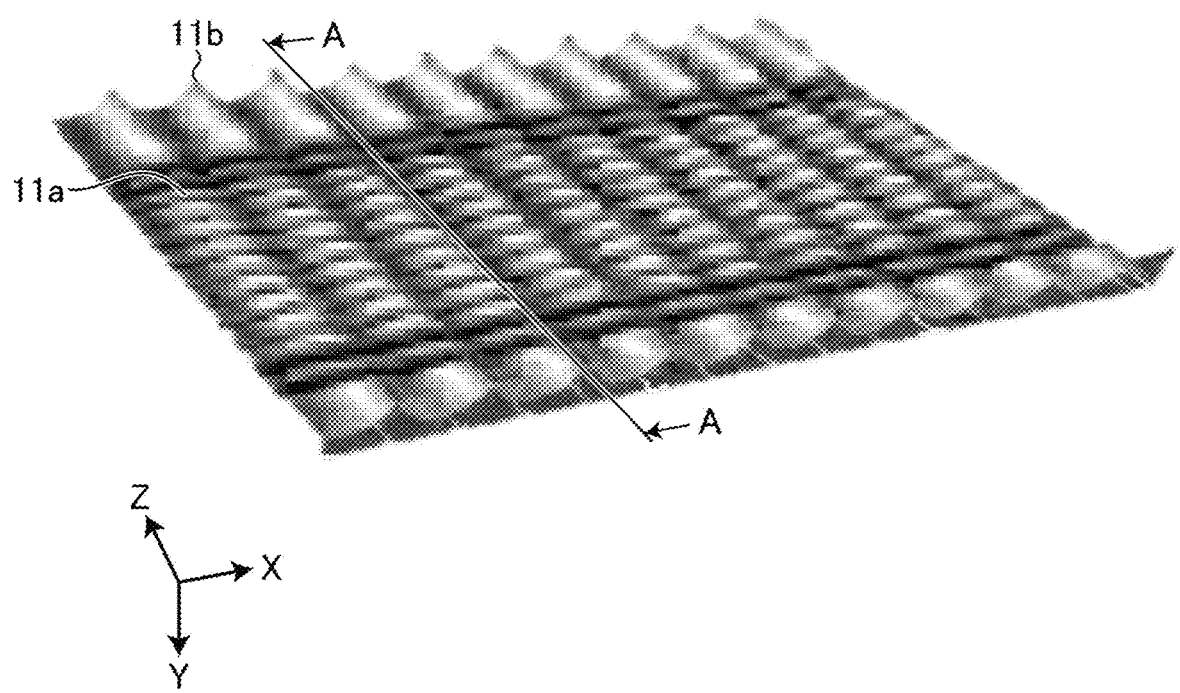
FIG. 7C is a view (3) for illustrating the light incident side surface of Example 1.
Figure 7D:
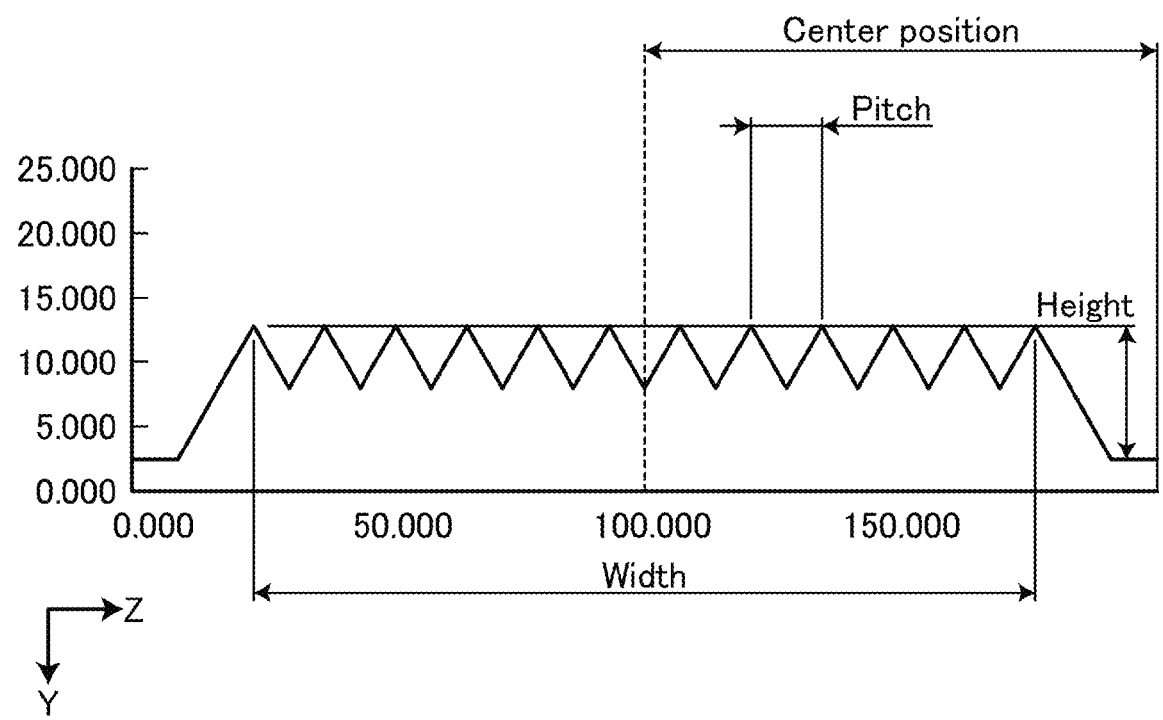
FIG. 7D is a view (4) for illustrating the light incident side surface of Example 1.
Figure 8:
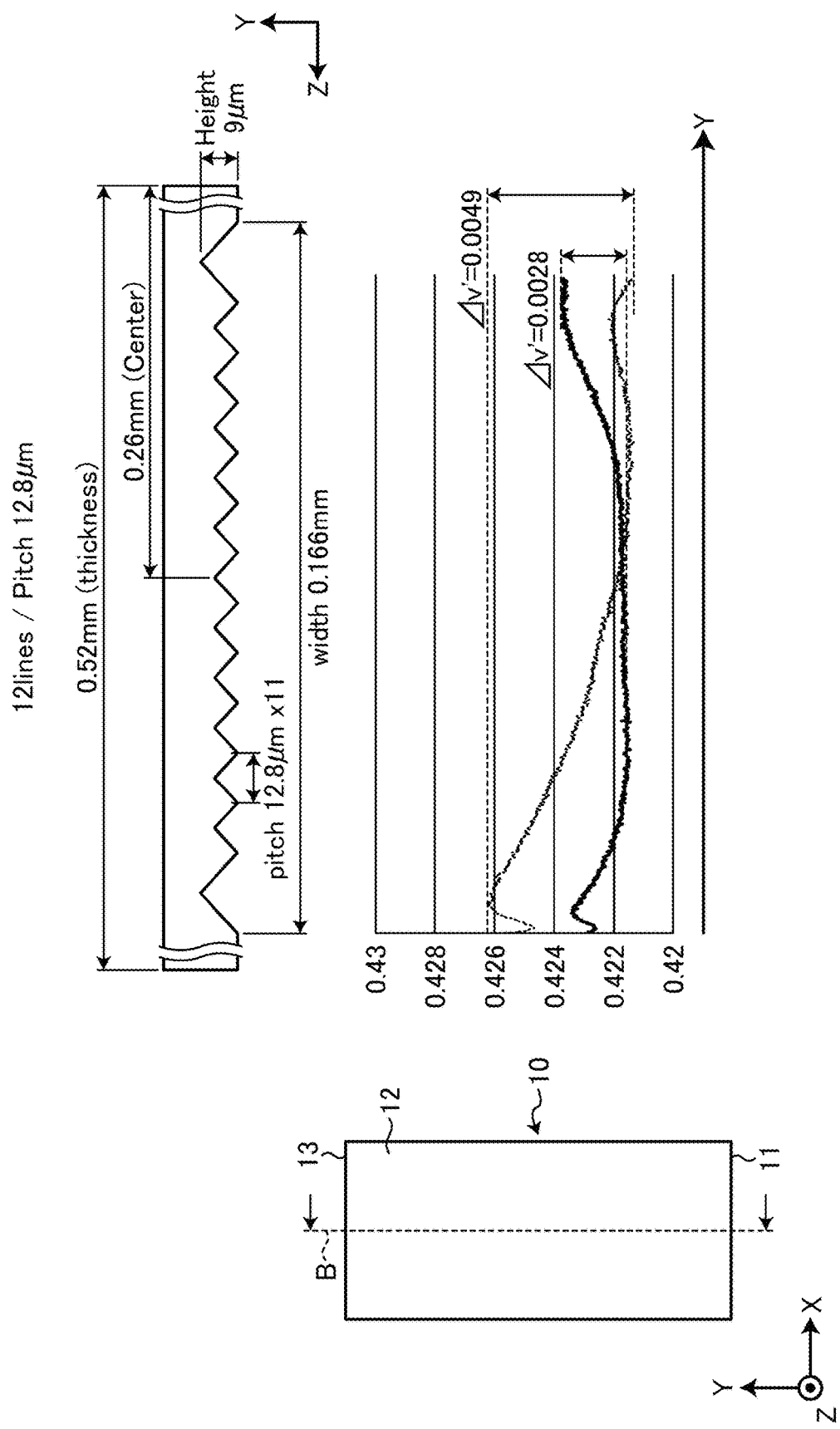
FIG. 8 is a view illustrating a color gradient on an emission surface of Example 1.

FIG. 6 is a view for illustrating Example 1, FIG. 7A, FIG. 7B, FIG. 7C, and FIG. 7D are views for illustrating a light incident side surface 11 of Example 1, and FIG. 8 is a view illustrating a color gradient of an emission surface 12 of Example 1.

FIG. 6 illustrates a schematic view (a top view in the figure) of the light incident side surface 11 of the light guide plate 10 of Example 1 when viewed from the Z-axis positive direction, a schematic view (a side view 1 in the figure) of the light incident side surface 11 when viewed from the Y-axis negative direction, and a schematic view (a side view 2 in the figure) of the light incident side surface 11 when viewed from the X-axis positive direction. As illustrated in the top view and the side view 1 of FIG. 6, the light incident side surface 11 is formed with a plurality of rows of semi-cylindrical second irregularities 11b extending in the thickness direction (Z-axis direction) over the entire surface of the light incident side surface. The second irregularity 11b is a lenticular lens in the present embodiment.

As illustrated in the side view 1 and the side view 2 of FIG. 6, in Example 1, twelve rows of triangular prism-shaped first irregularities 11a extending in the width direction (X-axis direction) are formed at a central part in the thickness direction (Z-axis direction) of the light incident side surface 11. Specifically, as illustrated in the side view 2 of FIG. 6, the light guide plate 10 is 0.52 mm thick, and the range formed with the first irregularities 11a on the light incident side surface 11 is 0.166 mm. In Example 1, a center of the range of 0.166 mm is a center in the thickness direction of the light guide plate 10 and is located at a position 0.26 mm in the Z-axis negative direction from the emission surface 12. In this range, the twelve rows of first irregularities 11a are formed at intervals of 12.8 μm. A height difference of the first irregularities 11a is 9 μm at the maximum.

FIG. 7A is a photograph of the side view 1 schematically illustrated in FIG. 6, FIG. 7B is an enlarged photograph of a region P illustrated in FIG. 7A, and FIG. 7C is a surface shape of the region P illustrated in FIG. 7A obtained by photographing with a laser microscope. FIG. 7D is a graph obtained by plotting surface positions on the light incident side surface 11 in the A-A cross-sectional views of FIG. 7B and FIG. 7C. The A-A cross section is a cross section obtained by cutting the light guide plate 10 at a YZ cross section passing through a boundary between two adjacent second irregularities 11b.

As illustrated in FIG. 7B and FIG. 7C, semi-cylindrical lenticular lenses (second irregularities 11b) extending in the Z-axis direction are consecutively arranged along the X-axis direction on the light incident side surface. Triangular prisms (first irregularities 11a) extending in the X-axis direction so as to cross the lenticular lenses are consecutively arranged along the Z-axis direction at the central part in the thickness direction. The second irregularity 11b (lenticular lens) and the first irregularity 12a (triangular prism) have the same height in the present embodiment.

A mold for manufacturing the shape of the light incident side surface 11 of Example 1 illustrated in FIG. 6 and FIGS. 7A to 7D can be made by repeating an operation of cutting a mold for forming a plurality of rows of lenticular lenses extending in the thickness direction by moving a cutting tool for triangular prisms in the width direction while shifting a position of the cutting tool in the thickness direction at intervals of 12.8 μm.

FIG. 8 is a graph obtained by plotting chromaticity v' values measured along a line (a dotted line B in the figure) along the Y-axis direction of the emission surface 12 in Example 1. In FIG. 8, the horizontal axis represents the position from the light incident side surface 11 to the terminal end surface 13 in a light guiding direction (Y-axis positive direction), and the vertical axis represents the v' value. In addition, in FIG. 8, a graph obtained by plotting v' values measured at the light guide plate of Comparative Example 1 is indicated by a dotted line, and in the light guide plate of Comparative Example 1, the first irregularities 11a are not formed and only the second irregularities 11b are formed. Additionally, in FIG. 8, a graph obtained by plotting v' values measured on the light guide plate of Example 1 is indicated by a solid line. Note that a larger v' value indicates a more yellowish color, and a smaller v' value indicates a more bluish color.

As can be seen from FIG. 8, Δv' indicating a difference between the maximum and minimum values of the v' value is 0.0049 in Comparative Example 1, whereas Δv' is reduced to 0.0028 in Example 1, and thus the color unevenness of the emission surface 12 is reduced by forming the first irregularities 11a.

Example 2

Figure 9:
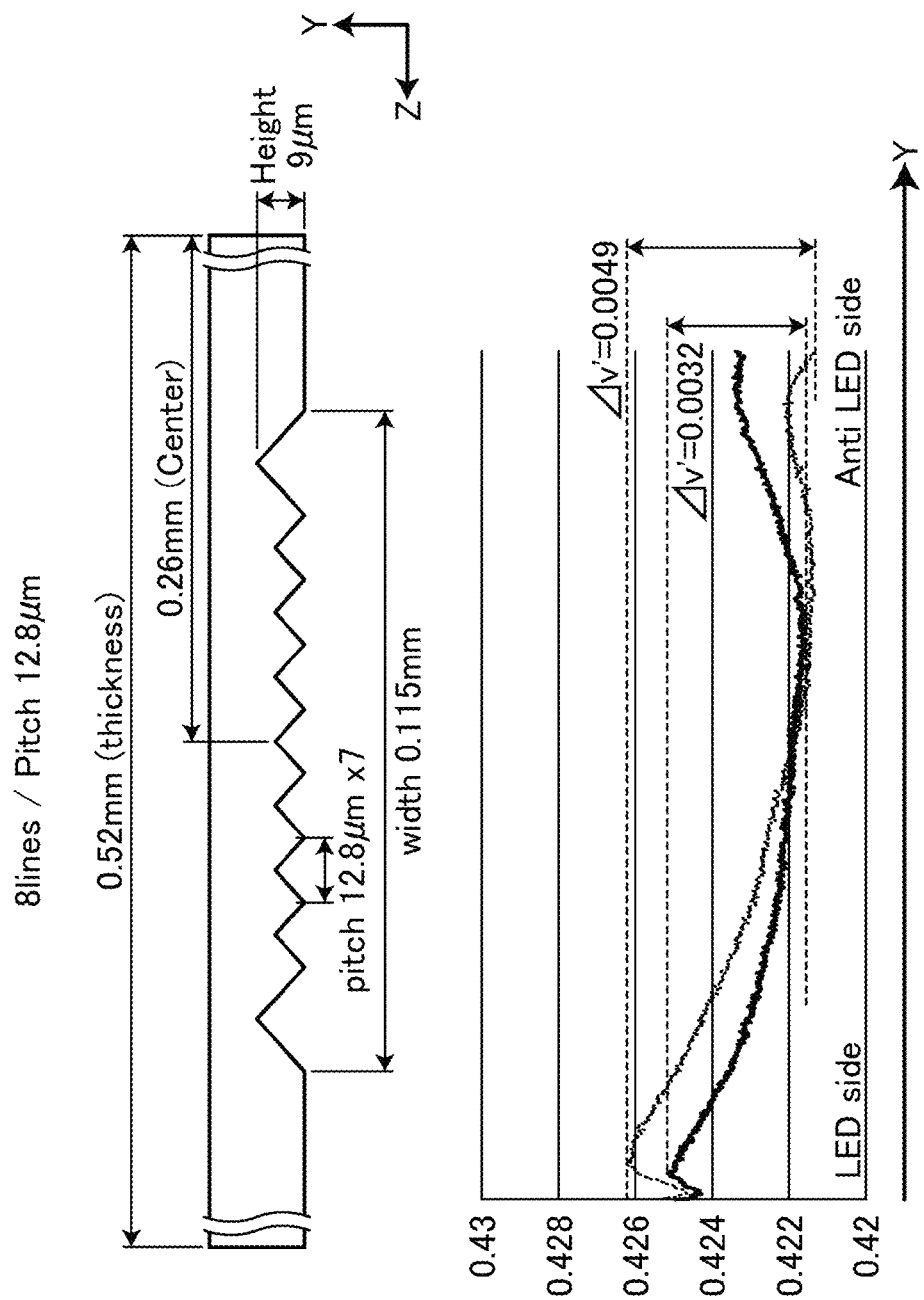
FIG. 9 is a view for illustrating Example 2.

FIG. 9 is a view for illustrating Example 2. As illustrated in the upper diagram of FIG. 9, the first irregularities 11a of Example 2 are formed in the same shape and at the same pitch (12.8 μm) as in Example 1, but the number of rows is eight unlike Example 1. That is, the range formed with the first irregularities 11a is 0.166 mm in Example 1 but is 0.115 μm in Example 2.

In the lower diagram of FIG. 9, the horizontal axis represents the position from the light incident side surface 11 to the terminal end surface 13 in the light guiding direction (Y-axis direction), and the vertical axis represents the v' value, as in FIG. 8. In addition, in FIG. 9, the graph of Comparative Example 1 is indicated by a dotted line, and the graph obtained by plotting v' values measured on the light guide plate 10 of Example 2 is indicated by a solid line.

As can be seen from FIG. 9, while Δv' is 0.0049 in Comparative Example 1, Δv' is reduced to 0.0032 in Example 2, and thus the color unevenness of the emission surface 12 is reduced. However, the value of Δv' is larger than the value in Example 1. This is thought to be because the range formed with the first irregularities 11a is narrower than the range in Example 1, an amount of diffusion of light with a large amount of blue component is smaller than the amount in Example 1. Example 3

Figure 10:
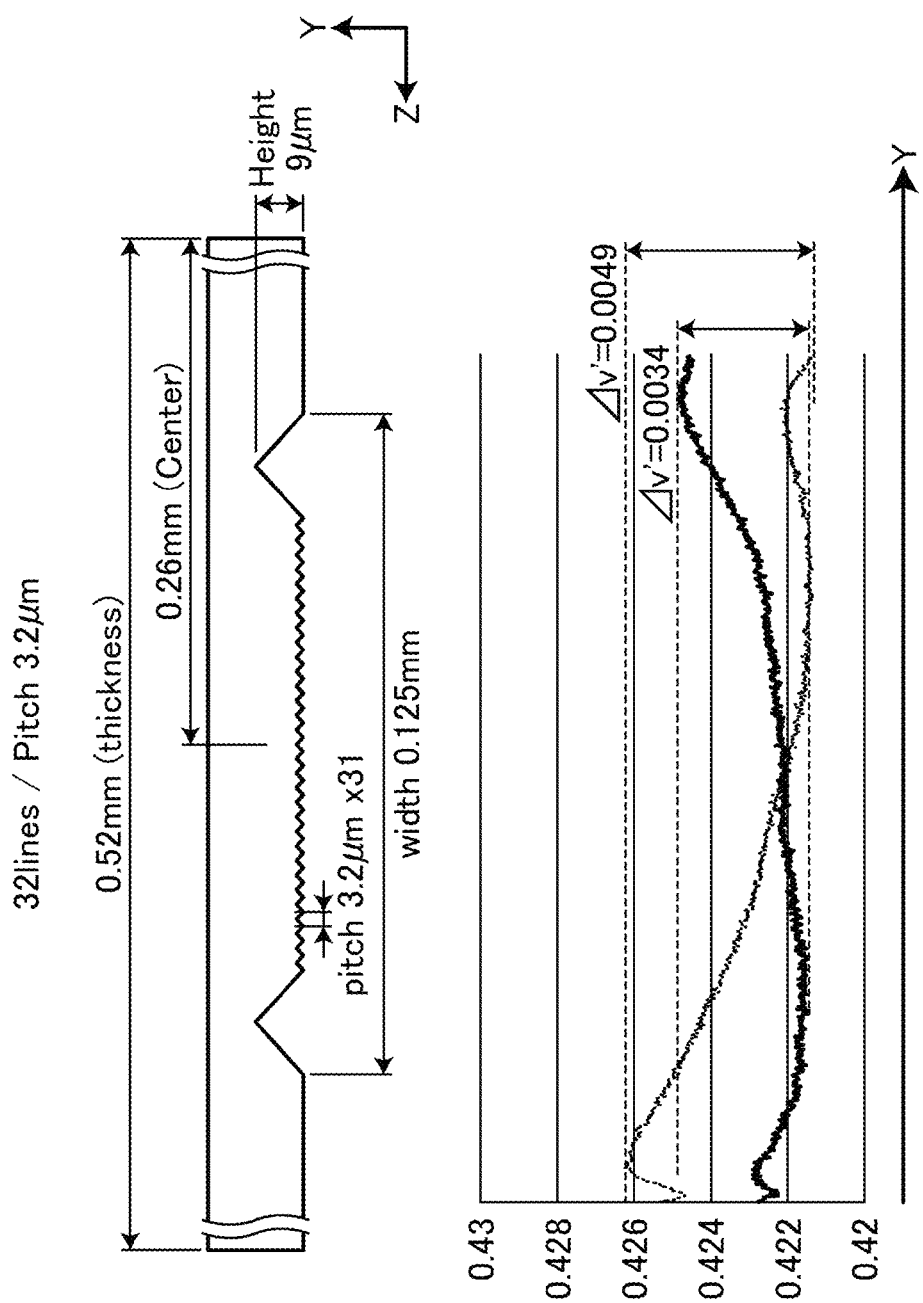
FIG. 10 is a view for illustrating Example 3.

FIG. 10 is a view for illustrating Example 3. As illustrated in the upper diagram of FIG. 10, the first irregularities 11a of Example 3 are formed in 32 rows at a pitch of 3.2 μm, unlike Example 1 and Example 2.

In the lower diagram of FIG. 10, the horizontal axis represents the position from the light incident side surface 11 to the terminal end surface 13 in the light guiding direction (Y-axis direction), and the vertical axis represents the v' value, as in FIGS. 8 and 9. In addition, in FIG. 10, the graph of Comparative Example 1 is indicated by a dotted line, and the graph obtained by plotting v' values measured on the light guide plate 10 of Example 3 is indicated by a solid line.

As can be seen from FIG. 10, while Δv' is 0.0049 in Comparative Example 1, Δv' is reduced to 0.0034 in Example 3, and thus the color unevenness of the emission surface 12 is reduced. However, the value of Δv' is larger than the values in Example 1 and Example 2. In addition, as compared with Examples 1 and 2, the blue tint becomes more intense on the light incident side surface 11 side, and the yellow tint becomes more intense on the terminal end surface 13 side. This is thought to be because the degree of diffusion of the straight light (light L1 illustrated in FIG. 2 and the like) having a strong blue tint is larger in Example 3 than in Example 1 and Example 2.

In other words, in the present embodiment, by appropriately adjusting the range being formed with the first irregularities 11a and the number of rows and the pitch of the first irregularities 11a, it is possible to make the light guide plate 10 satisfying chromaticity characteristics required for a backlight while reducing the color unevenness on the emission surface 12. Note that a shape of the first irregularity 11a is also one of design parameters of the first irregularity 11a. In Examples 1 to 3, the shape of the first irregularity 11a is a triangular prism shape of an isosceles triangle having an obtuse apex angle. However, the shape of the first irregularity 11a may be any shape as long as the chromaticity characteristics required for a backlight can be achieved.

As described above, the planar illumination device 1 according to the embodiment includes the light guide plate 10 and the plurality of light sources 20. The light guide plate 10 emits light incident from the light incident side surface 11 from the emission surface 12. The plurality of light sources 20 are arranged in the longitudinal direction (X-axis direction) of the light incident side surface 11 and emit light incident on the light incident side surface 11. The light source 20 includes the blue LED chip 21 for emitting blue light (an example of a light emitting element configured to emit first light) and the sealing body 22 made of a resin. In the sealing body 22, a phosphor for emitting yellow light by the light emitted by the blue LED chip 21 (an example of a wavelength conversion material configured to emit second light having a longer wavelength than a wavelength of the first light by the light emitted by the light emitting element) is dispersed. The light incident side surface 11 is formed with the plurality of rows of first irregularities 11a extending in the width direction (X-axis direction) of the light guide plate 10 and diffusing incident light in the thickness direction (Z-axis direction) in the partial range, in the thickness direction (Z-axis direction) of the light guide plate 10, opposing the blue LED chip 21. Thereby, in the present embodiment, it is possible to suppress color unevenness in the emission surface 12.

That is, in the present embodiment, since the plurality of first irregularities 11a for diffusing incident light in the thickness direction (Z-axis direction) are formed only in the range opposing the blue LED chip 21, light having a large amount of yellow component and light having a large amount of blue component can be mixed and emitted from the emission surface 12 in the vicinity of the light incident side surface 11. In addition, in the present embodiment, the first irregularities 11a can reduce light having a large amount of blue component traveling in the light guide plate 10, and can reduce a blue tint from the center of the emission surface 12 to the terminal end surface 3 side. Note that it is difficult to realize such an effect when the first irregularities 11a are formed at the entire surface of the light incident side surface 11.

Additionally, in the present embodiment, the plurality of rows of second irregularities 11b extending in the thickness direction (Z-axis direction) and diffusing incident light in the width direction (X-axis direction) are formed at substantially the entire surface of the light incident side surface 11. The light emitted from the light sources 20 is diffused in the width direction on the light incident side surface 11 by the second irregularities 11b. As a result, it is possible to suppress a difference in brightness and darkness in the width direction of the emission surface 12 caused by the light sources 20 being disposed at intervals.

Note that, if the second irregularities 11b are formed only in the range opposing the blue LED chip 21, brightness and darkness may occur in the width direction of the emission surface 12. In addition, when comparing the case of forming the second irregularities 11b only in the range opposing the blue LED chip 21 and the case of forming the first irregularities 11a only in the range opposing the blue LED chip 21 as in the embodiment, the alignment of the light sources 20 and the light incident side surface 11 is easier in the embodiment. That is, in the present embodiment, it is possible to suppress color unevenness in the emission surface 12 without requiring highly precise alignment of the light sources 20 and the light guide plate 10.

Note that only the first irregularities 11a may be formed on the light incident side surface 11 without forming the second irregularities 11b as long as the chromaticity characteristics required for a backlight can be achieved.

Modification Example

Figure 11:
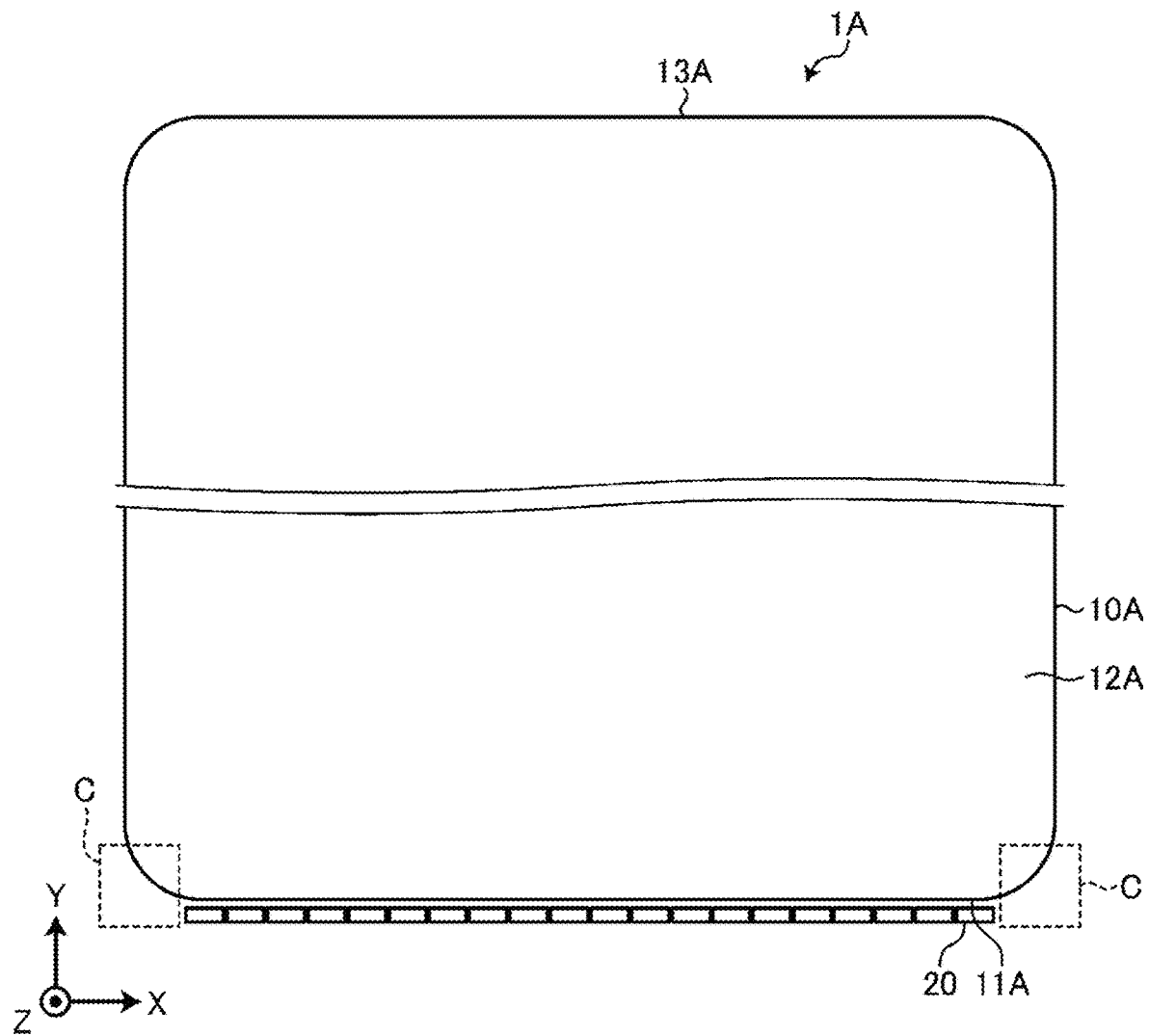
FIG. 11 is a view (1) for illustrating a modification example.
Figure 12:
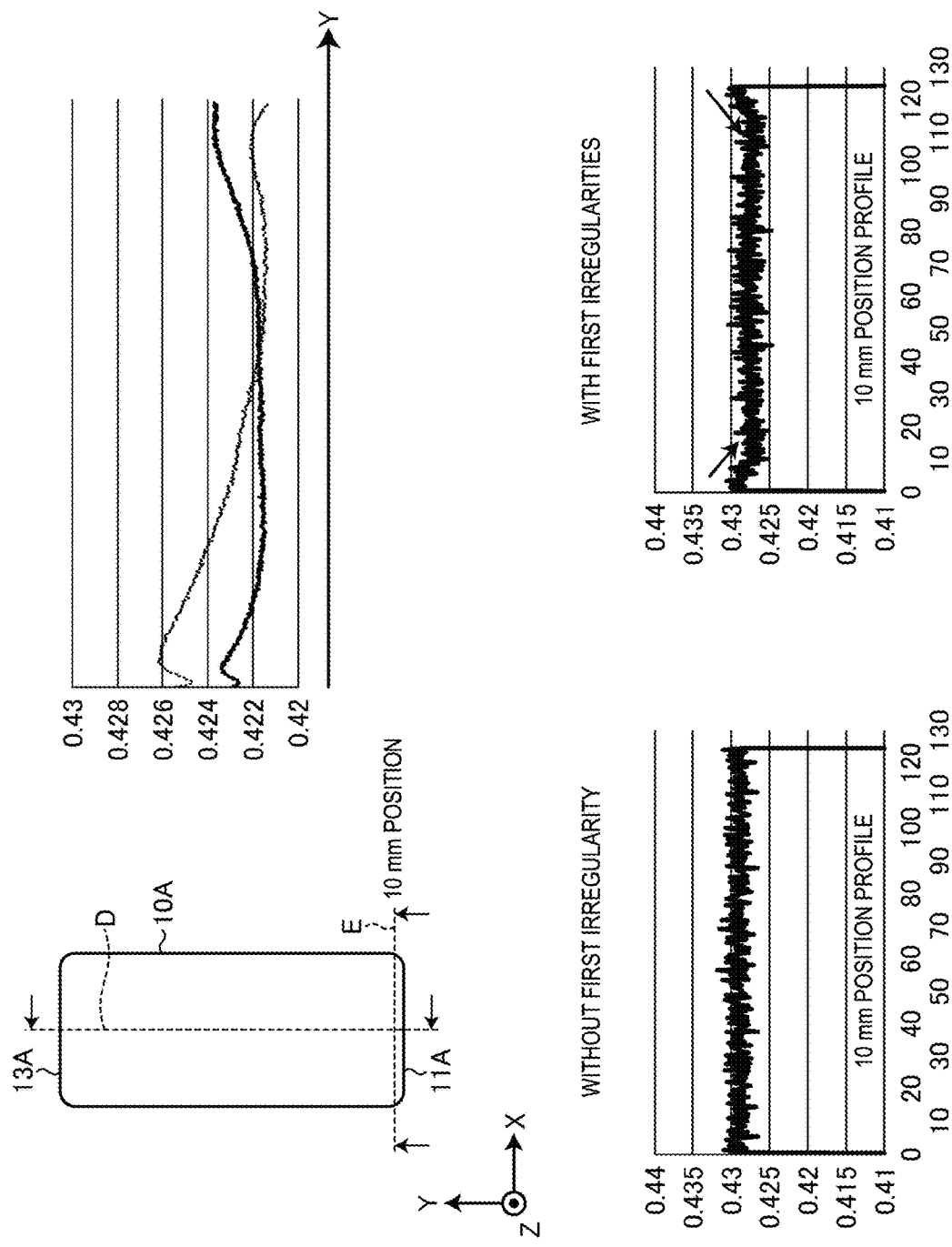
FIG. 12 is a view (2) for illustrating a modification example.
Figure 13:
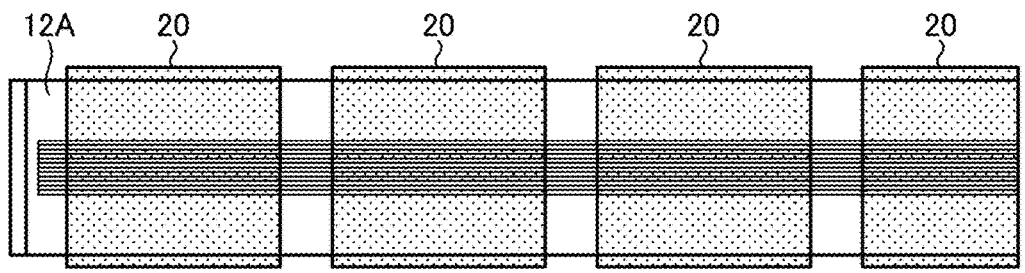
FIG. 13 is a view (3) for illustrating a modification example.
Figure 13:
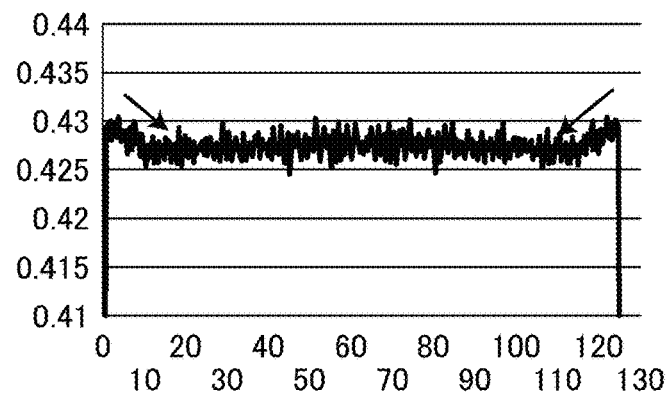
Figure 13:
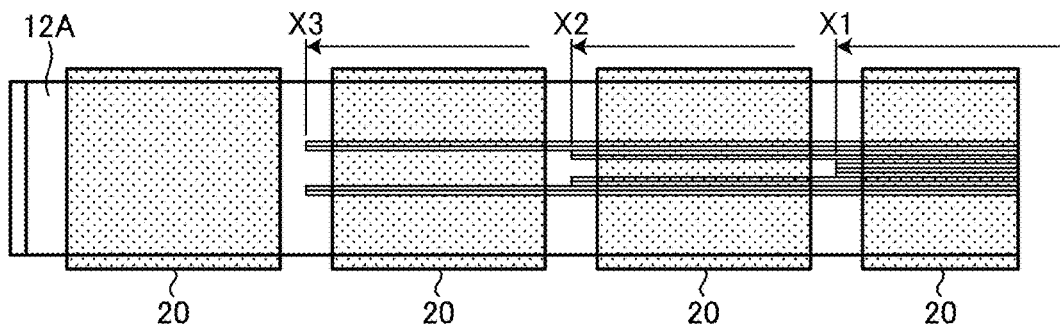
Figure 13:
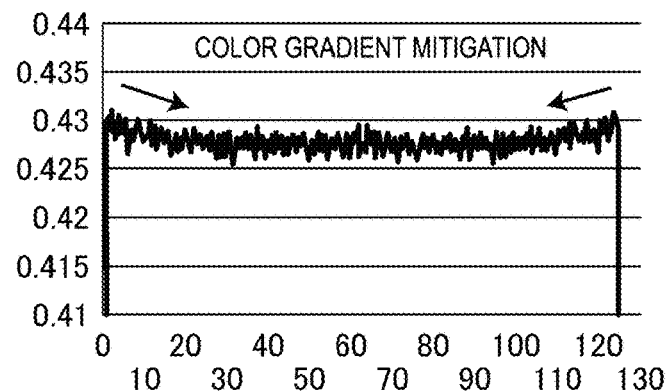

Although the light guide plate 10 of the above-described embodiment has a rectangular shape in a top view, in recent years, a light guide plate having a rectangular shape with chamfered corner parts (for example, a shape with R-chamfered corner parts) is often used from a standpoint of design or the like. Hereinafter, a formation pattern of the first irregularity 11a applied when such a light guide plate is used will be described with reference to FIG. 11, FIG. 12, and FIG. 13. FIG. 11, FIG. 12, and FIG. 13 are views for illustrating a modification example.

A planar illumination device 1A according to a modification example illustrated in FIG. 11 includes a light guide plate 10A and a plurality of light sources 20. As illustrated in FIG. 10, the light guide plate 10A has a rectangular shape with chamfered corners in a top view. Specifically, the light guide plate 10A has a rectangular shape with R-shaped corner parts in a top view. When the light guide plate 10A having such a shape is used, the light sources 20 cannot be disposed at both ends of the light incident side surface 11A (see a region C in the figure).

The light guide plate 10A has a light incident side surface 11A including the plurality of light sources 20 disposed so as to oppose each other, and a terminal end surface 13A being a side surface opposite from the light incident side surface 11A. As in Example 1, the light incident side surface 11A is formed with twelve rows of first irregularities 11a and a plurality of rows of second irregularities 11b.

The upper right diagram of FIG. 12 is a graph obtained by plotting chromaticity v' values measured along a line (a dotted line D in the upper left diagram of FIG. 12) along the Y-axis direction of the emission surface 12A of the light guide plate 10A. In the upper right diagram of FIG. 12, the horizontal axis represents the position from the light incident side surface 11A to the terminal end surface 13A in the light guiding direction (Y-axis positive direction), and the vertical axis represents the v' value. In addition, in the upper right diagram of FIG. 12, a graph obtained by plotting v' values measured at the light guide plate of Comparative Example 2 is indicated by a dotted line, and in the light guide plate of Comparative Example 2, the first irregularities 11a are not formed and only the second irregularities 11b are formed. In the upper right diagram of FIG. 12, a graph obtained by plotting v' values measured at the light guide plate 10A is indicated by a solid line. The graph in the upper right diagram of FIG. 12 has a shape similar to the shape of the graph in FIG. 8, and shows reduction of the color unevenness of the emission surface 12A in the light guiding direction.

However, in the light guide plate 10A where the light sources 20 cannot be disposed at the corner parts, the color gradient in the width direction (X-axis direction) becomes large. The lower right diagram of FIG. 12 shows a graph obtained by plotting chromaticity v' values measured at a position (dotted line E in the upper left diagram of FIG. 12) being a line along the X-axis direction of the emission surface 12A of the light guide plate 10A and being 10 mm away from the light incident side surface 11A in the Y-axis positive direction. In addition, the lower left diagram of FIG. 12 is a graph of a light guide plate of Comparative Example 2. That is, the lower left diagram of FIG. 12 is a graph of a light guide plate without the first irregularities 11a, and the lower right diagram of FIG. 12 is a graph of a light guide plate with the first irregularities 11a.

As illustrated in the lower right diagram of FIG. 12, at the 10 mm position, the blue component increases in the range formed with the light sources 20, and the v' values are smaller as compared with Comparative Example 2, but the v' values are larger at both ends in the width direction of the light guide plate 10A, and are substantially the same as the v' values of Comparative Example 2. That is, when the first irregularities 11a are formed with the same formation pattern as in Example 1, in the light guide plate 10A, the yellow component decreases and the blue component increases at the center in the width direction, but at both ends in the width direction corresponding to the region C, the light with a large amount of blue component diffused by the first irregularities 11a does not reach and the yellow component is dominant, resulting in a large color gradient in the width direction.

As a countermeasure, in the modification example, the number of rows of the first irregularities 11a decreases from the center in the longitudinal direction of the light incident side surface 11A toward an end part. For example, the formation pattern of the first irregularities 11a illustrated in (1) of FIG. 13 is changed to the formation pattern illustrated in (2) of FIG. 13. (1) of FIG. 13 is a schematic view illustrating twelve rows of first irregularities 11a formed on the entire surface of the light incident side surface 11A. (1) of FIG. 13 also illustrates the graph of the lower right diagram of FIG. 12 described above.

On the other hand, in the formation pattern of (2) of FIG. 13, the number of rows of the first irregularities 11a decreases toward the end part of the light incident side surface 11A, and the first irregularity 11a is not formed at a surface in front of the light source 20 located at the terminal end. Specifically, in the formation pattern of (2) of FIG. 13, twelve rows of the first irregularities 11a are formed from the center to the X1, eight rows of the first irregularities 11a are formed from the X1 to the X2, four rows of the first irregularities 11a are formed from the X2 to the X3, and no first irregularity 11a is formed from the X3 to the end part. Note that the second irregularities 11b are not illustrated in the schematic views illustrated in (1) and (2) of FIG. 13.

(2) of FIG. 13 illustrates a graph obtained by plotting chromaticity v' values measured at a position distant from the light incident side surface 11A by 10 mm in the Y-axis positive direction in such a formation pattern of the first irregularities 1111a. As can be seen when the graphs of (1) and (2) of FIG. 13 are compared with each other, in (2) of FIG. 13, the chromaticity changes more gently at both ends in the width direction, and the color gradient in the width direction is mitigated. This is thought to be because the amount of diffused light having a large amount of blue component gradually decreases from the center in the width direction toward the end part due to the formation pattern of (2) of FIG. 13.

Note that (2) of FIG. 13 illustrates the pattern with the number of rows of the first irregularities 11a gradually decreasing from the center in the thickness direction toward both ends in the range in the thickness direction formed with the first irregularities 11a, but the pattern is not limited to this pattern. For example, it may be a pattern with the number of rows of the first irregularities 11a gradually decreasing from both ends in the thickness direction toward the center, or a pattern with the number of rows of the first irregularities gradually decreasing from one end in the thickness direction toward the other end.

As described above, the planar illumination device 1A according to the modification example includes the light guide plate 10A having a rectangular shape with chamfered corner parts in a top view. When the light guide plate 10A having a shape not having the light sources 20 at the corner parts is used, the diffusion effect of the blue component by the first irregularities 11a cannot be obtained at the corner portions, and a phenomenon of large color gradient in the width direction on the emission surface 12A occurs. Therefore, in the modification example, the number of rows of the first irregularities 11a is decreased from the center in the longitudinal direction (X-axis direction) of the light incident side surface 11A toward the end part. Thereby, the amount of diffused light having a large amount of blue component is gradually decreased from the center in the width direction toward the end part, and the color gradient in the width direction can be suppressed.

Note that the disclosure is not limited by the embodiments described below. A configuration obtained by appropriately combining the above-mentioned components is also included in the disclosure. Further effects and modification examples can be easily derived by a person skilled in the art. Thus, a wide range of aspects of the disclosure is not limited to the embodiment described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device, comprising:
   a light guide plate configured to emit light incident from a light incident side surface from one principal surface of two principal surfaces; and
   a plurality of light sources arranged in a longitudinal direction of the light incident side surface and configured to emit light incident on the light incident side surface,
   wherein the light sources include a light emitting element configured to emit first light, and a wavelength conversion material configured to emit second light having a wavelength longer than a wavelength of the first light by the light emitted by the light emitting element, and the light incident side surface is formed with a plurality of rows of first optical elements extending in a width direction of the light guide plate and configured to diffuse incident light in a thickness direction of the light guide plate in a partial range in the thickness direction of the light guide plate, the range opposing the light emitting element, wherein
   the number of rows of the first optical elements decreases from a center in the longitudinal direction of the light incident side surface toward an end part.

2. The planar illumination device according to claim 1, wherein the light incident side surface is formed with a plurality of rows of second optical elements extending in the thickness direction and configured to diffuse the incident light in the width direction.

3. The planar illumination device according to claim 2, wherein the first optical elements have a triangular prism shape, and
   the second optical elements are lenticular lenses.

4. The planar illumination device according to claim 1, wherein the light guide plate has a rectangular shape with chamfered corner parts in a top view.

5. The planar illumination device according to claim 1, wherein the first light is blue light and the second light is yellow light.

6. A planar illumination device, comprising:
   a light guide plate configured to emit light incident from a light incident side surface from one principal surface of two principal surfaces; and
   a plurality of light sources arranged in a longitudinal direction of the light incident side surface and configured to emit light incident on the light incident side surface,
   wherein the light sources include a light emitting element configured to emit first light, and a wavelength conversion material configured to emit second light having a wavelength longer than a wavelength of the first light by the light emitted by the light emitting element,
   the light incident side surface includes a central part in a thickness direction, the central part being provided with a plurality of rows of first optical elements extending in a width direction of the light guide plate and configured to diffuse incident light in the thickness direction, and
   a remaining part of the light incident side surface other than the central part is provided with a plurality of rows of second optical elements extending in the thickness direction and configured to diffuse incident light in the width direction.

7. The planar illumination device according to claim 6, wherein the second optical elements are provided across the first optical elements.

8. The planar illumination device according to claim 6, wherein the first optical elements have a height that is same as a height of the second optical elements.

9. The planar illumination device according to claim 6, wherein the second optical elements are provided across the first optical elements, and
   the first optical elements have a height that is same as a height of the second optical elements.

* * * * *